United States Patent
Hui

(10) Patent No.: US 7,145,607 B1
(45) Date of Patent: Dec. 5, 2006

(54) SPATIO-TEMPORAL VIDEO NOISE REDUCTION SYSTEM

(75) Inventor: Yau Wai Lucas Hui, Singapore (SG)

(73) Assignee: STMicroelectronics Asia Pacific Pte. Ltd., Singapore (SG)

( * ) Notice: Subject to any disclaimer, the term of this patent is extended or adjusted under 35 U.S.C. 154(b) by 0 days.

(21) Appl. No.: 10/130,093

(22) PCT Filed: Nov. 11, 1999

(86) PCT No.: PCT/SG99/00125

§ 371 (c)(1),
(2), (4) Date: Sep. 30, 2002

(87) PCT Pub. No.: WO01/35636

PCT Pub. Date: May 17, 2001

(51) Int. Cl.
*H04N 5/21* (2006.01)

(52) U.S. Cl. ..................................... 348/607

(58) Field of Classification Search ............... 348/607, 348/620, 624, 615, 699, 700, 618; 382/107, 382/261; 358/463
See application file for complete search history.

(56) References Cited

U.S. PATENT DOCUMENTS

| | | | | |
|---|---|---|---|---|
| 5,093,722 A | * | 3/1992 | Miyaguchi et al. | 348/441 |
| 5,442,407 A | * | 8/1995 | Iu | 348/620 |
| 5,446,501 A | * | 8/1995 | Takemoto et al. | 348/620 |
| 5,500,685 A | * | 3/1996 | Kokaram | 348/620 |
| 5,519,453 A | | 5/1996 | Wischermann | 348/620 |
| 5,548,659 A | * | 8/1996 | Okamoto | 382/107 |
| 5,574,512 A | * | 11/1996 | Saeger | 348/620 |
| 5,579,058 A | * | 11/1996 | Lee | 348/699 |
| 5,600,731 A | * | 2/1997 | Sezan et al. | 382/107 |
| 5,610,729 A | * | 3/1997 | Nakajima | 358/463 |
| 5,715,335 A | * | 2/1998 | De Haan et al. | 382/265 |
| 5,742,355 A | * | 4/1998 | De Haan et al. | 348/607 |
| 5,903,680 A | * | 5/1999 | De Haan et al. | 382/265 |
| 5,969,777 A | * | 10/1999 | Mawatari | 375/240.26 |
| 5,995,154 A | * | 11/1999 | Heimburger | 348/448 |
| 6,061,100 A | * | 5/2000 | Ward et al. | 348/607 |
| 6,067,125 A | * | 5/2000 | May | 348/607 |
| 6,307,888 B1 | * | 10/2001 | Le Clerc | 375/240.29 |
| 6,359,658 B1 | * | 3/2002 | He et al. | 348/607 |
| 6,657,676 B1 | * | 12/2003 | Borneo et al. | 348/607 |
| 6,930,676 B1 | * | 8/2005 | De Haan et al. | 345/204 |
| 6,933,982 B1 | * | 8/2005 | Wittig | 348/607 |

FOREIGN PATENT DOCUMENTS

| | | |
|---|---|---|
| EP | 0 796 010 A1 | 9/1997 |
| WO | WO 96/15625 | 5/1996 |
| WO | WO 98/18256 | 4/1998 |

* cited by examiner

*Primary Examiner*—Paulos M. Natnael
(74) *Attorney, Agent, or Firm*—Lisa K. Jorgensen; Robert Iannucci; Seed IP Law Group PLLC

(57) ABSTRACT

A method and system for digital video noise reduction which includes a picture analyser (103) for analysing pictures in a video sequence to determine the amount of moving regions therein, a noise level detector (102) for estimating the noise level (N) in the video sequence, a filtering level estimator (105, 103) for determining a maximum filtering level (L) for each picture based on the amount of moving regions and the estimated noise level (N) and a spatial filter (106) and a temporal filter (107), the temporal filter being coupled to the filter level estimator for controlling the level of filtering of each picture in the sequence in accordance with the maximum filtering level.

15 Claims, 6 Drawing Sheets

SPATIO-TEMPORAL VIDEO NOISE REDUCTION SYSTEM

The present invention relates to digital video processing and noise reduction. It also relates to method and apparatus for improving efficiency in a video encoding system.

Noise reduction techniques have been applied to TV or video signals to improve subjective viewing quality of the signals as well as the compression efficiency in video encoding systems. Such noise reduction techniques include varieties of low-pass filters, median filters, adaptive spatial filters, and temporal recursive filters.

In video sequences with little or no object movement, recursive filters are effective in improving signal-to-noise ratio. One example of temporal recursive noise reduction filter is disclosed in U.S. Pat. No. 5,574,512 and illustrated in FIG. 2. The filter utilises a median filter with input values from current pixel as well as previous field and frame pixels. The median filter allows certain levels of motion adaptive filtering. The amount of filtering is further subjected to a limiter and an attenuator. The limiter is used as a means to control the level-effectiveness of noise reduction, while the attenuator ensures that the transients of the system will eventually decay to zero. An alternative method of motion adaptive filtering is non-linear filtering according to frame-to-frame pixel differences.

To improve noise reduction efficiency, spatial and temporal filtering are usually combined. For example, a method of spatio-temporal filtering is described in "A New Cascaded Spatio-Temporal Noise Reduction Scheme for Interlaced Video," by K Jostschulte and A Amer, Proceedings of International Conference on Image Processing 1998, volume 2 page 493–497. Typical spatial filters applied are edge preserving noise filters, which are low-pass filters applied along edges.

In applications where the input video sequence is very noisy, a temporal recursive filter is effective in image regions with little or no movement. On the other hand, applying temporal recursive filter to moving region will create the "ghost image" effect due to residual information from previous pictures. In known systems, this effect is minimized by turning off or toning down the recursive filter within the moving region (ie, motion adaptive temporal recursive filter). However, reducing or removing the recursive filtering in the moving region creates another side effect (comet tail effect) as the noise signal becomes more visible compared to other regions. Other known solutions such as motion compensated noise reduction are costly and, not robust as uncovered regions are not necessarily predictable.

Spatial noise filters may be used to enhance overall signal-top noise ratio above the noise reduction produced by temporal recursive noise filters. Spatial noise filters may also be used specifically to reduce noise in moving regions so as to reduce the "comet tail" effect. Nevertheless, performance of the spatial filter is very limited compared to the temporal recursive filter in regions with little or no movement, and therefore artefacts will still be visible.

OBJECTS OF THE INVENTION

An object of the present invention is to provide effective noise reduction for noisy video sequences. Specifically, an object of the present invention is to adaptively provide effective noise reduction and/or minimum artefacts.

DISCLOSURE OF THE INVENTION

In the present invention, the maximum level of noise reduction in a motion adaptive temporal recursive filter is controlled to maximise noise reduction and/or minimise artefacts. The controlling is done at the picture level based on the noise level within the video sequence as well as the overall amount of movement from one picture to the other. When there is little or no movement, the maximum noise reductio level is set according to the noise level within the video sequence; on the other hand, when there is high amount of movement, the maximum noise reduction level is reduced to a level comparable to the effective noise reduction level by the temporal filter and/or spatial filter on the moving regions in the picture.

More specifically the invention provides a method of reducing noise in a digital video signal including the steps of:

analysing pictures in a video sequence to determine the amount of moving regions therein;

estimating the noise level (N) in the video sequence;

determining a maximum filtering level (L) for each picture based on said analysis of the amount of moving regions and said estimated noise level;

applying the video sequence to filter means; and controlling the filter means in accordance with said maximum filtering level.

The invention also provides a digital video noise reduction system including:

a picture analyser for analysing pictures in a video sequence to determine the amount of moving regions therein;

a noise level detector for estimating the noise level (N) in the video sequence;

a filtering level estimator for determining a maximum filtering level (L) for each picture based on said amount of moving regions and said estimated noise level; and filter means coupled to said filter level estimator for controlling the level of filtering of each picture in the sequence in accordance with said maximum filtering level.

DETAILED DESCRIPTION OF PREFERRED EMBODIMENTS

The invention will now be further described with reference to the accompanying drawings, in which.

Figure 1:
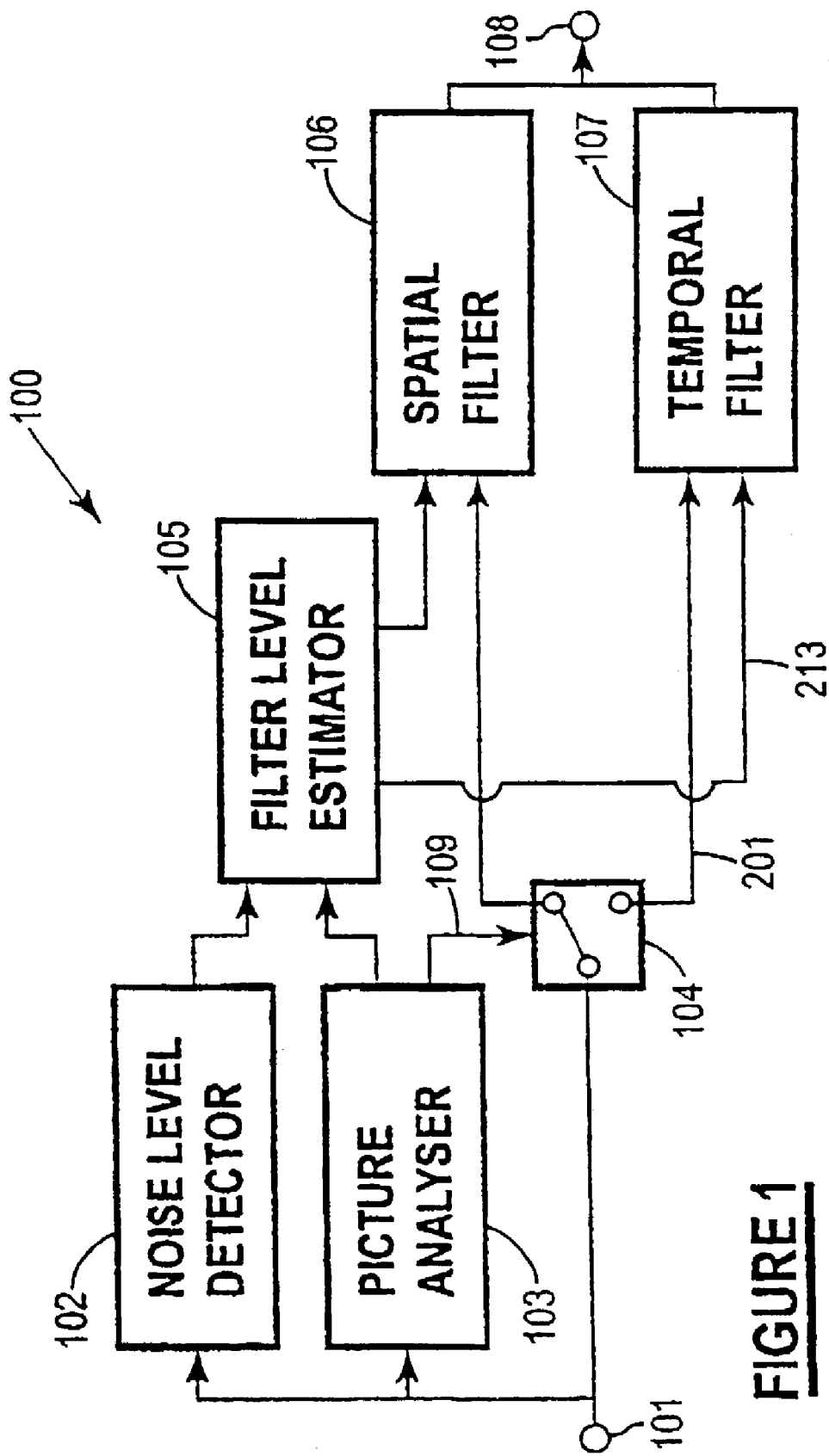
FIG. 1 is a block diagram of a digital video processing and noise reduction system of the invention.

FIG. 1 shows in block diagram form an embodiment of a digital video processing and noise reduction system 100 of the invention. The major components of the system include a noise level detector 102, picture analyser 103, switch 104, filter level estimator 105, spatial filter 106 and temporal filter 107. Digital video signals are applied to input terminal 101 which is coupled to the inputs of the noise level detector 102 and picture analyser 103. Each picture of the input video signal is subjected to noise level detection by the noise level detector 102 for estimating the level of noise signal (N) within the picture or video sequence. The noise level (N) is estimated to prevent underfiltering which would result in a very noise input or overfiltering which would result in blurring of the video signal. Known circuitry may be used for the noise level detector 102. An example of a suitable noise level detector is disclosed in U.S. Pat. No. 5,657,401, the content of which is incorporated herein by reference. In certain applications it may also be possible to predetermine the noise level and therefore simplify implementation.

The picture analyser 103 essentially detects the amount or degree of motion in the picture. Again, known picture analysers can be used for this purpose. Preferably, the analyser 103 compares the pixels within each picture of the input video signal to corresponding pixels from a previous picture. A simple method of motion detection may include the steps of determining the absolute difference between the current pixel value and the co-site pixel value from the previous picture and comparing the absolute difference with a predetermined threshold value in order to determine if there is sufficient motion. A more robust alternative method may include the step of making a comparison of the absolute differences between temporal neighbours and spatial neighbours of the current pixel in order to determine the degree of motion of the current pixel.

Outputs from the noise level detector 102 and picture analyser 103 are inputted to the filter level estimator 105, outputs of which are inputted to the filters 106 and 107. Output from the analyser 103 is also coupled to a control line 109 for the switch 104 in order to determine whether the input video signal is switched by the switch 104 to either the spatial filter 106 or the temporal filter 107. The outputs of the filters 106 and 107 are connected in parallel to an output terminal 108.

Where the picture analyser 103 detects little or no motion, the switch 104 is controlled so that the input video signal is applied to the temporal filter 107. When however motion above a certain level is detected, the switch 104 is controlled to apply the input video signal to the spatial filter 106. This results in an arrangement in which when there is little or no motion detected, the pixel is filtered by the temporal filter 107 to achieve efficient noise reduction. On the other hand, in the case where sufficient motion is detected, the pixel is filtered by the spatial filter 106 so as to avoid any ghost image artefact.

At the picture level, the picture analyser 103 calculates a ratio (M) of pixels detected with little or no motion over the total number of pixels within the picture. The ratio (M) indicates the average amount of non-moving regions within the picture. Based on the calculated ratio (M) and estimated noise level (N), the filter level estimator 105 estimates a maximum filter level ($L_t$) to be used in the temporal filter 107. A method of estimating the maximum filter level ($L_t$) is given by:

$$L_t = k_t \times N \times M$$

where $L_t$ is the maximum filter level,
$k_t$ is a pre-determined constant,
N is the estimated noise level, and
M is the calculated ratio for non-moving regions within the picture.

The value of constant $k_t$ may be determined according to the type of spatial/temporal filter and noise level detector used, or specific application needs.

Optionally, a second maximum filter level ($L_t$) may be estimated for use by the spatial filter 106. A method of estimating the second maximum filter level ($L_t$) is may be given by:

$$L_2 = ks \times N$$

where $k_t$ is a pre-determined constant.

Figure 2:
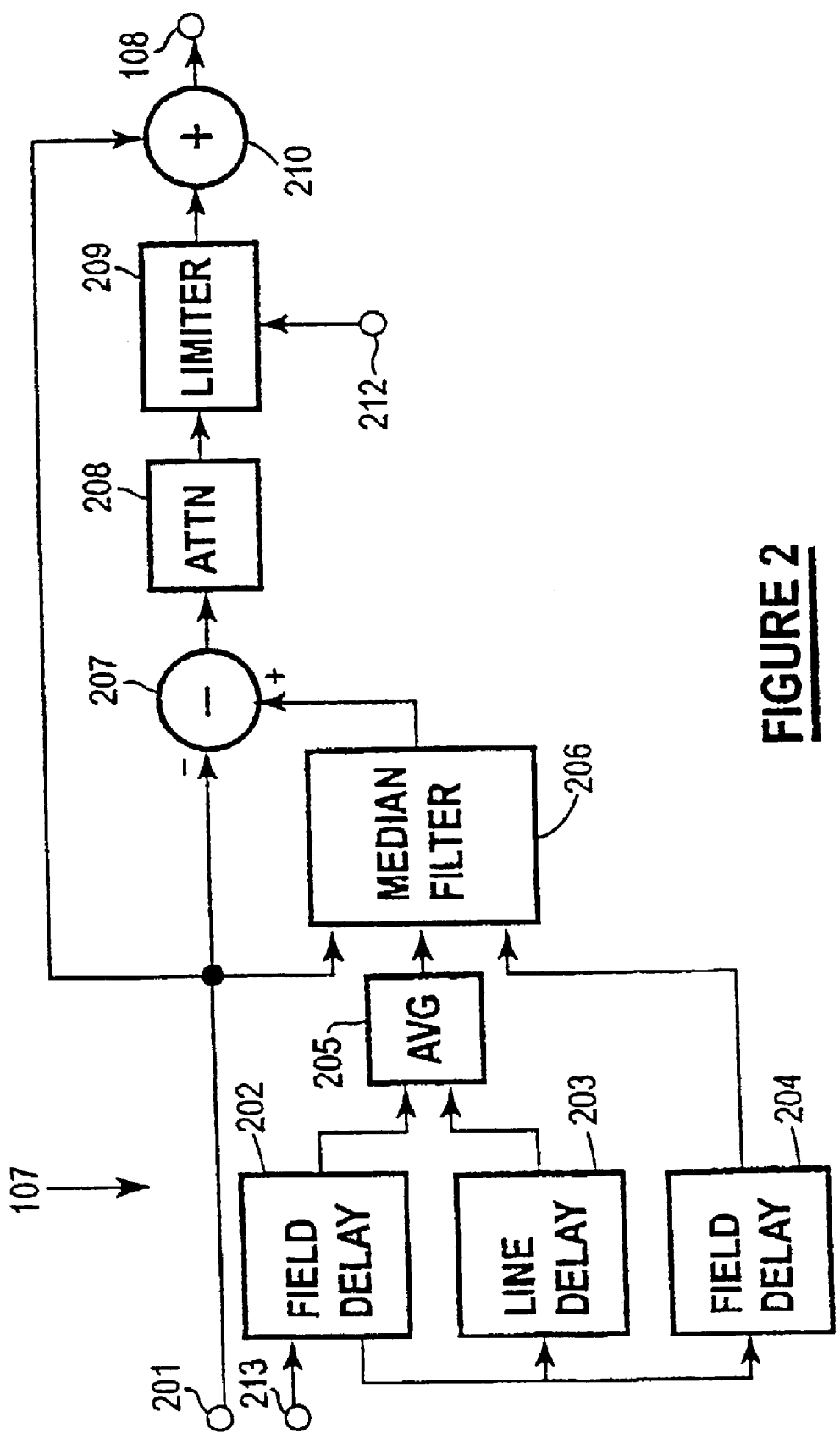
FIG. 2 is a more detailed block diagram of an embodiment of the temporal filter.

FIG. 2 illustrates in block diagram form an embodiment of the temporal filter 107. The filter 107 may comprise a motion adaptive temporal recursive filter for interlaced video signal processing of the type disclosed in U.S. Pat. No. 5,574,512, the content of which is incorporated herein by cross-reference. The structure of the temporal filter 107 will be briefly described below. Its major components include field delay memories 202 and 204, line delay memory 203, averaging circuit 205, median filter 206, subtracting circuit 207, attenuator 208, limiter 209 and adder 210. In this circuit, a current pixel on line 201 from the switch 104 is inputted to the median filter 206 and is filtered thereby. The median filter 206 also receives inputs from the average of the two nearest pixels from a delayed field and the co-sited pixel from a delayed frame. This is effected by arranging for the field delay memories 202 and 204 and line delay memory 203 to receive at input 213 noise filtered pixels from the output terminal 108, i.e. the output of adder 210. Output from the field delay memory 202 is inputted to one input of the averaging circuit 205. Another output of the field delay 202 is inputted to the line delay memory 203 and field delay memory 204 as shown. Output from the line delay memory 203 is inputted to the other input of the averaging circuit 205 the output of which is coupled to a second input of the median filter 206. Output from the field delay memory 204 is inputted to the third input of the median filter 206. In order to minimise hardware implementation costs, the field and/or line delay memories may be shared with memories used in the noise level estimator 105, picture analyser 103, temporal filter 107 and/or the spatial filter 106. Further, an external video encoding system could also be utilised.

Output from the median filter 206 is inputted to the subtracter circuit 207 which also receives input video on the line 201. Output from the substructure circuit 207 is inputted to the attenuator 208 the output of which is coupled to a limiter 209. The output of the limiter 209 is coupled to the adder 210 which also receives video input from the line 201. These components essentially determine the amount of filtering applied to the input video. The attenuator 208 typically applies a ⅛ reduction to ensure the transients of the system will eventually decay to zero. A reference or limiting value is coupled at input 212 to the limiter 209 so that the limiter is set according to the estimated maximum filter level ($L_t$) of the current picture field to maximise noise reduction and/or minimise motion artefacts. The reference or limiting value is derived from the output of the filter level estimator 105.

The spatial filter 106 may be implemented by known forms of spatial filters, for example those described in the article by K. Jostschulte and A. Amer referred to above. Preferably the spatial filter 106 is an edge preserving noise filter which applies low pass filtering along edges in the picture. In addition it is possible to control the amount of filtering in the spatial filter using the same limiter method where basically the absolute differences between the input pixel and the filtered pixel are limited by the determined second maximum filter level ($L_t$).

The system 100 maximises the level of noise filtering when images in the video sequence are stationary. This level of noise reduction is especially useful as human vision is usually more sensitive to noise present in stationary regions. The maximum level of noise filtering is reduced globally according to the amount of moving regions within the images. Although this has the effect of lesser efficiency in terms of noise reduction in the non-moving regions of the images, much of the noise reduction artefacts such as ghost images and comet trails are removed. Finally, with overall maximised noise reduction better compression is achieved in applications utilising video encoding systems.

Figure 3:
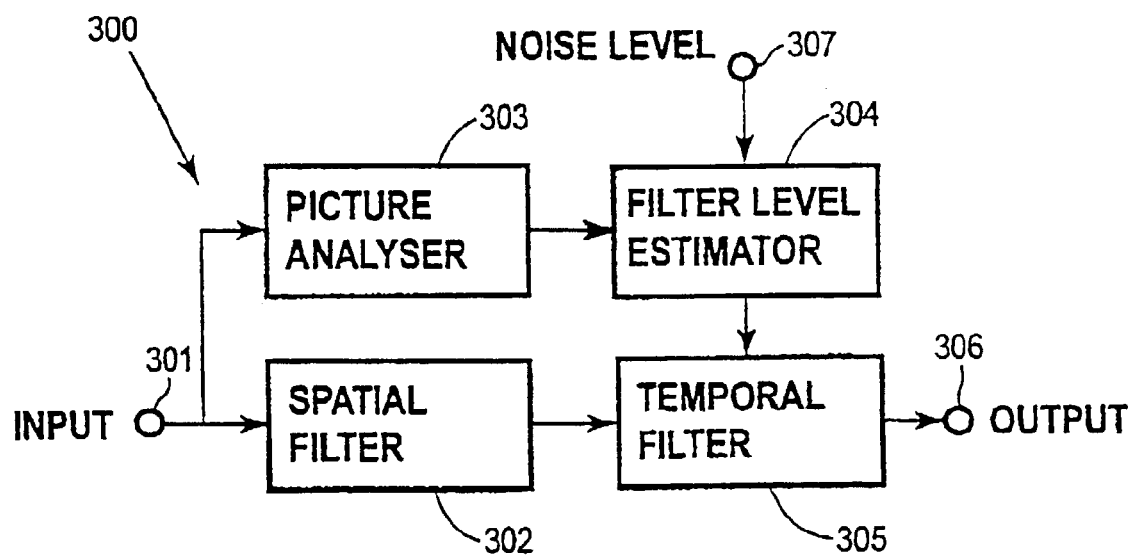
FIG. 3 is a block diagram of a second embodiment of the digital video processing and noise reduction system.
Figure 4:
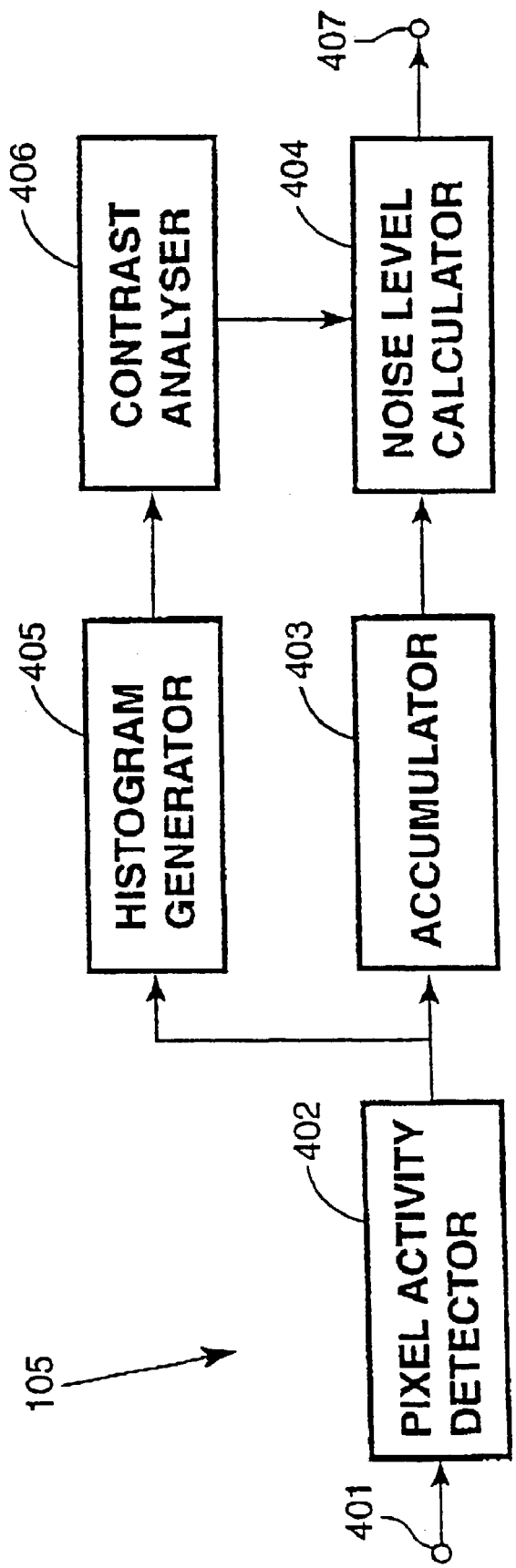
FIG. 4 is a block diagram of a filter level estimator circuit.

FIG. 3 illustrates in block diagram form an alternative digital video processing and noise reduction system 300. The major components of the system 300 include a spatial filter 302, picture analyser 303, filter level estimator 304 and temporal filter 305. In this embodiment, a cascaded spatio-temporal filtering method is used by coupling the spatial filter 302 and temporal filter 305 in series, as shown. Input video signals at input 301 are also coupled to the picture analyser 303 the output of which is coupled to the filter level estimator 304. Output from the filter level estimator 304 is also coupled to control the temporal filter 305. It is possible to utilise known filters for the spatial filter 302 and the temporal filter 305.

Examples of suitable filters are found in the aforementioned paper by K Jostschulte and A Amer.

In the system 300, the maximum level of filtering is controlled globally at the picture level at the temporal filter 305. This maximum level is determined by the filter level estimator 304 based at the picture interval. The maximum filter level is determined according to an input noise level which is applied at input 307 derived from the noise level estimator 102 and the results of the picture analyser 303 which analyses the amount of moving regions within the picture, as described in the earlier embodiment. Typically, the analysis of the moving regions is done on a previous picture to minimise latency and reduced implementation cost. The system 300 produces noise level reduction similar to but not the same as that produced by the embodiment of FIGS. 1 and 2. The difference in result is attributable to the fact that in the system of FIGS. 1 and 2 there is adaptive spatial or temporal filtering whereas in FIG. 3 there is cascaded spatial and temporal filtering.

The filter level estimator 105 can be implemented in a number of ways in order to determine the level of filtering which is optimum having regard to the noise level in the digital video sequence. FIGS. 4 to 7 illustrate one circuit realisation for the estimator 105 but it is to be understood that others could also be used. The function of the filter level estimator 105 shown in FIGS. 4 to 7 will now be briefly described below.

The major components of the circuit include a pixel activity detector 402, accumulator 403, noise level calculator 404, histogram generator 405 and contrast analyser 406. Typically, a digitised video signal is coupled to the input terminal 401. The video signal is applied to the input of the pixel activity detector 402 which calculates for each pixel in the input video signal a pixel activity value. In the preferred embodiment of the invention, the pixel activity value is calculated as the absolute difference between the current pixel value and the mean value of its neighbouring pixels, i.e. pixel activity=abs [pixel−(pixel left+pixel+pixel right)/3]. In the preferred embodiment, the neighbouring pixels are the two adjacent pixels in the line one either side of the pixel in question. It would, of course, be possible to alternatively or additionally include pixels above and below the pixel in question or pixels which are two or three pixels distant to the left or right. Techniques for selection of suitable neighbouring pixels is well known in the art.

Alternatively, a high pass filter with an absolute value output may be used as a pixel activity detector. Many types of suitable high pass filters are known in the art and one of these may be selected for use, the final selection largely being a question of quality, accuracy and cost. A very simple example of a suitable high pass filter has the following coefficients [−0.25, 0.5, and −0.25]. Output from the detector 402 is coupled to the input of the accumulator 403 which operates to sum all of the pixel activity values of a picture. Output from the detector 402 is also inputted to the histogram generator 405 which generates a histogram of the calculated pixel activity value. The accumulator 403 is arranged to produce the mean pixel activity by summing all pixel activities from the detector 402 for picture and dividing by the total number of pixels in the picture. It may be possible to simplify implementation of the circuit by reducing the size of the histogram table produced by the generator 405, for example by scaling down or truncating pixel activity values. Scaling down pixel activity value can simply be accomplished by deeming that the new pixel activity value equals the pixel activity value divided by two. Truncating pixel activity values can be accomplished by the following logical step:

if (pixel activity value<32) new pixel activity value=pixel activity value; else new pixel activity value=31

Figure 7:
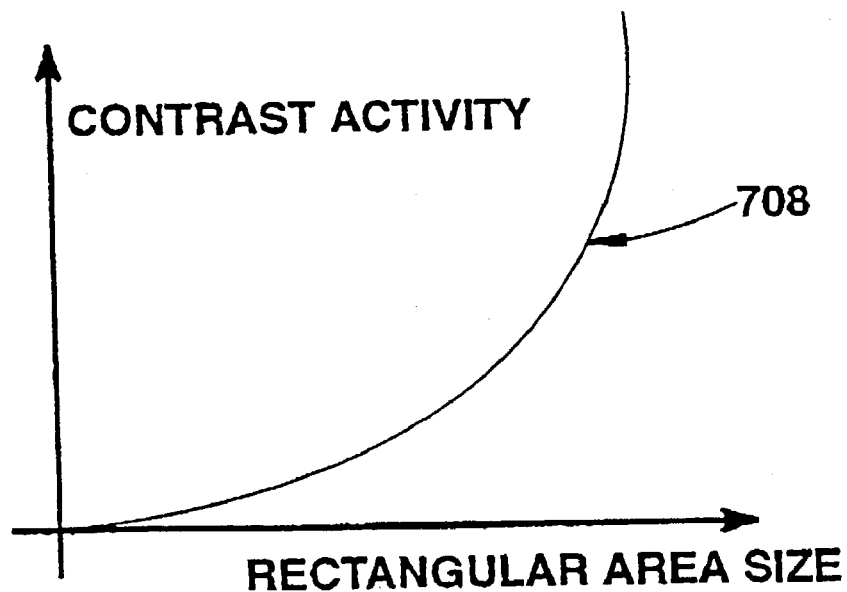
FIG. 7 shows graphically parameters used to estimate contrast activity.

Output from the histogram generator 405 is coupled to the input of the contrast analyser 406. At the end of a picture, the contrast analyser 406 examines the generated histogram and from that estimates a contrast activity value. Typically, it is possible to estimate how sharp or blurry a picture is by looking at the shape of the histogram. In accordance with the invention, a method of estimating the contrast activity by reference to two parameters as follows. The first parameter is a maximum rectangular area size containing the histogram. The second parameter is obtained from a look-up table which estimates contrast activity. This method is diagrammatically illustrated in FIG. 6 where the histogram 601 is shown with the horizontal axis being pixel activity and the vertical axis being the count of pixels. The maximum rectangular area 602 is drawn from the points where the histogram meets the horizontal and vertical axes, as shown. FIG. 7 shows a look-up table in graphical form with the horizontal axis being rectangular area size and the vertical axis being contrast activity. The look-up table determines the contrast activity as a function of the rectangular area size. The curve 708 in the look-up table can be determined by experiments for translating the rectangular size to a contrast activity value for the picture. The look-up table can be determined by experiments in which various images with known or desired output noise levels are subjected to the system to generate corresponding histogram rectangular sizes and average pixel activity values, and from these collection of values a graph such as FIG. 7 can be generated. Accordingly, persons skilled in the art will be able to generate appropriate look-up tables. Other methods such as linear interpolation or spline estimation may also be used instead of the look-up table. These techniques are also well known in the art and generally relate to the field of estimation of a curve or transfer function.

From the accumulated pixel activity, an average pixel activity for the picture is calculated using the noise level calculator 404 which receives input from the accumulator 403 and contrast analyser 406. Basically, the noise level calculator 404 offsets or subtracts the accumulated pixel activity values by the contrast activity from the contrast analyser 406. Output from the noise level accumulator 404 is coupled to an output terminal 407, the signals on which represent the estimated output noise level as required. It is possible to limit the output noise levels so as to reside within predetermined minimum and maximum values according to requirements so as to make subsequent digital processing for efficacious.

Figure 5:
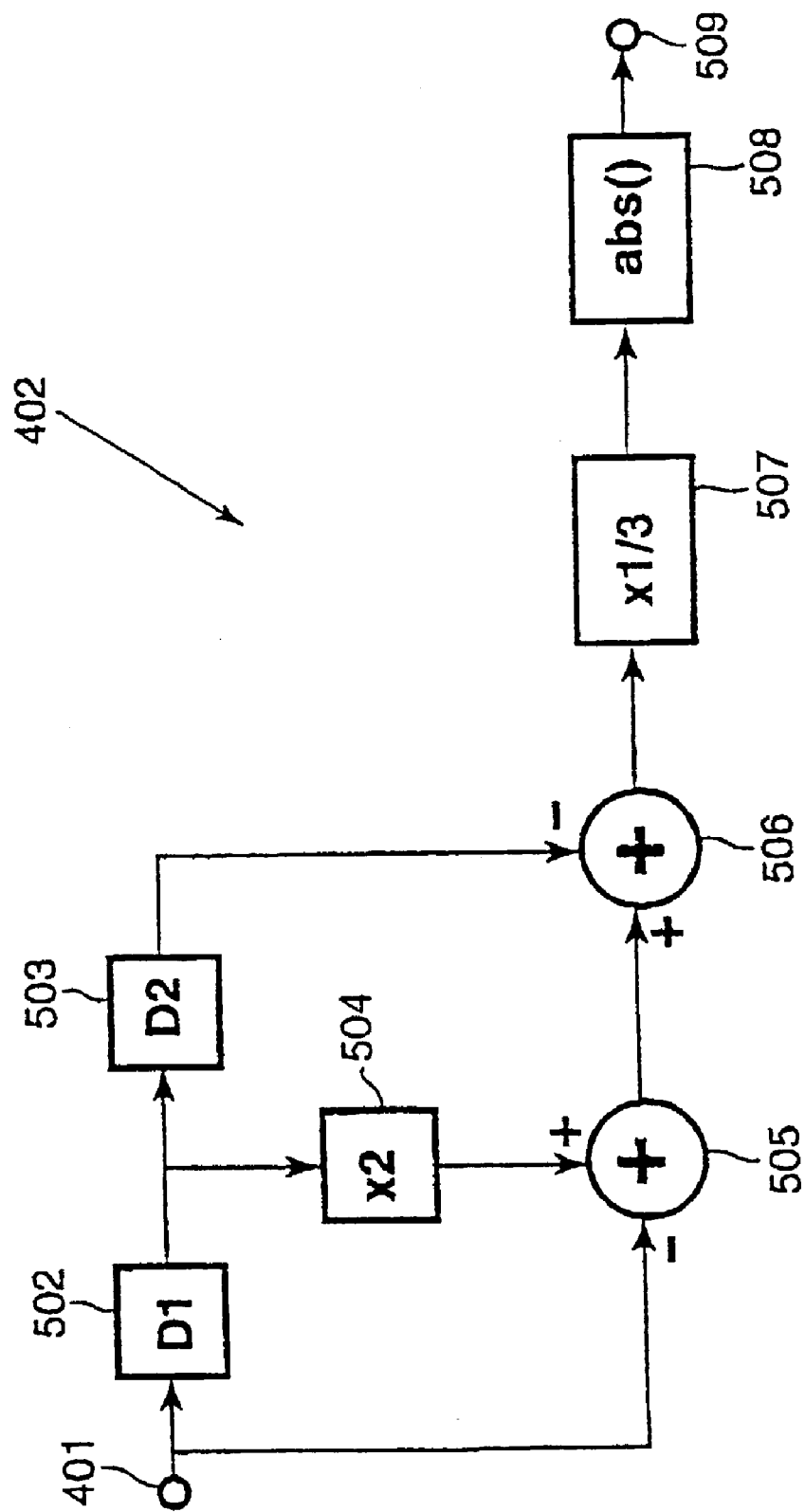
FIG. 5 is a more detailed block diagram of part of the circuit shown in FIG. 4.
Figure 6:
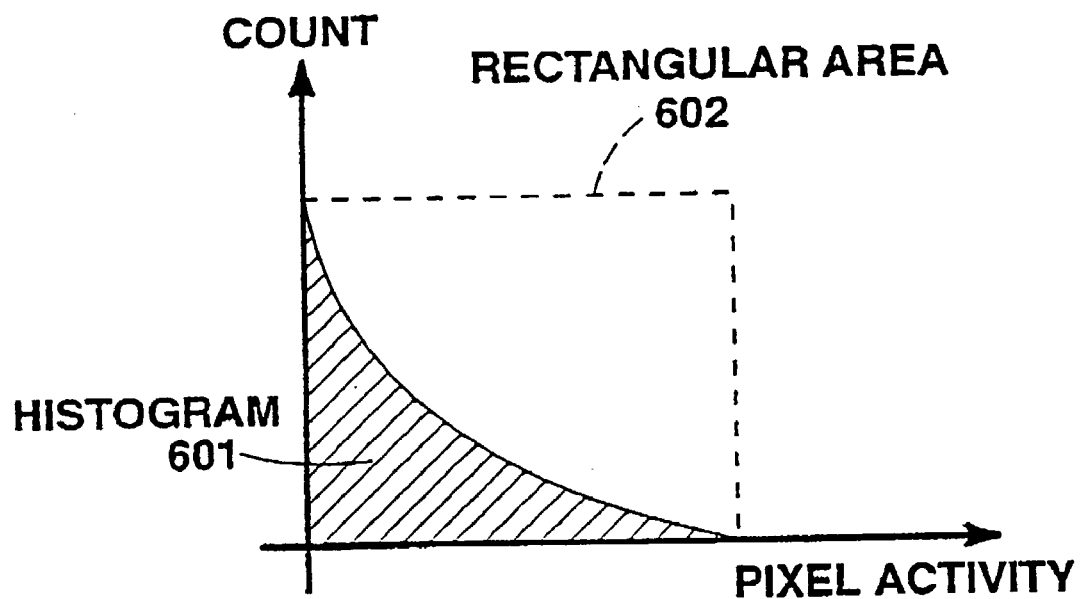
FIG. 6 is a histogram of pixel activity.

FIG. 5 illustrates in more detail an example of the pixel activity detector 402. Successive pixels of each line of video data are inputted at the terminal 401. The circuit calculates difference between a pixel and the mean value of the pixels at its left and right. The circuit of FIG. 5 includes first and second delay elements 502 and 503, first and second adders 505 and 506 and first and second multipliers 504 and 507. Output from the second multiplier is coupled to an absolute value circuit 508, the output of which is coupled to output terminal 509 which is the input to the histogram generator 405 and accumulator 403. The circuit components are operable to determine the difference between a pixel and the mean value of the pixel and its neighbouring left and right pixels because of the action of the delay elements 502 and 503 which have delays equal to a typical period of a pixel. Other arrangements could be implemented for obtaining differences between the pixel and mean values of other adjacent pixels. The absolute value of the difference constitutes the output pixel activity value appearing at the terminal 509.

It is possible to implement the accumulator 403, noise level calculator 404, histogram generator 405 and contrast analyser 406 using techniques which are well known in the art. It is therefore not necessary to describe these components in detail.

The output at output terminal 407 can be coupled to provide the inputs to the spatial filter 106 and temporal filter 107, as shown in FIG. 1.

Many modifications will be apparent to those skilled in the art without department from the spirit and scope of the invention.

The invention claimed is:

1. A method of reducing noise in a digital video signal, the method comprising:
    analyzing pictures in a video sequence to determine the amount of moving regions therein;
    estimating the noise level in the video sequence;
    determining a maximum filtering level for each picture based on said amount of moving regions and said estimated noise levels;
    applying the video sequence to a filter circuit that includes a spatial filter and a temporal filter; and
    controlling the filter circuit in accordance with said maximum filtering level by:
        switching the applied video sequence to the temporal filter when the determined amount of moving regions is relatively low; and
        switching the applied video sequence to the spatial filter when the determined amount of moving regions is relatively high.

2. A method as claimed in claim 1 wherein said step of analyzing in the pictures in the video sequence includes the step of:
    calculating a ratio of pixels detected with little or no motion relative to the total number of pixels in the picture.

3. A method as claimed in claim 2, wherein the step of determining a maximum filtering level includes the step of:
    determining a maximum filtering level for the temporal filter by multiplying said ratio and said estimated noise level.

4. A method as claimed in claim 2, wherein the step of determining a maximum filtering includes the step of:
    determining a maximum filtering level for the spatial filter which is proportional to said estimated noise level.

5. A digital video noise reduction system including:
    a picture analyzer for analyzing pictures in a video sequence to determine the amount of moving regions therein;
    a noise level detector for estimating the noise level in the video sequence;
    a filtering level estimator for determining a maximum filtering level for each picture based on said amount of moving regions and said estimated noise level; and
    filter means coupled to said filter level estimator for controlling the level of filtering of each picture in the sequence in accordance with said maximum filtering level, wherein the filter means includes a spatial filter and a temporal filter, the picture analyzer is operable to calculate a ratio of pixels detected with little or no motion relative to the total number of pixels in the picture, and the filter level estimator is operable to determine a maximum filtering level for the temporal filter by multiplying said ratio and said estimated noise level.

6. A system as claimed in claim 5, wherein the filter means includes a switch controlled by output from the picture analyzer and is operable to switch the video sequence to the spatial filter or temporal filter in accordance with the amount of moving regions determined by the picture analyzer.

7. A system as claimed in claim 6 wherein the filter level estimator is operable to determine a maximum filtering level for the spatial filter which is proportional to said estimated noise level.

8. A system as claimed in claim 6 wherein outputs of the spatial filter and temporal filter are connected in parallel to an output terminal.

9. A system as claimed in claim 5 wherein the filter means includes a spatial filter cascaded with a temporal filter.

10. A system as claimed in claim 9 wherein the filtering level estimator having a maximum noise level input, the estimator being coupled to control said temporal filter.

11. A digital video noise reduction system including:
    a picture analyzer for analyzing pictures in a video sequence to determine the amount of moving regions therein;
    a noise level detector for estimating the noise level in the video sequence;
    a filtering level estimator for determining a maximum filtering level for each picture based on said amount of moving regions and said estimated noise level; and
    filter means coupled to said filter level estimator for controlling the level of filtering of each picture in the sequence in accordance with said maximum filtering level, wherein the filter means includes a spatial filter, a temporal filter and a switch and wherein the switch is controlled by output from the picture analyzer and is operable to switch the video sequence to the spatial filter or temporal filter in accordance with the amount of moving regions determined by the picture analyzer;
    wherein the temporal filter includes a median filter which receives a current pixel and inputs from the average of the two nearest pixels from a delayed field and a co-sited pixel from a delayed frame.

12. A system as claimed in claim 11 wherein the temporal filter includes a subtractor circuit which receives input from the video sequence and output of the median filter.

13. A system as claimed in claim 12 wherein the temporal filter includes an attenuator which receives output from the subtractor circuit and a limiter which receives output from the subtractor circuit via an attenuator.

14. A system as claimed in claim 13 wherein the temporal filter further includes an adder which receives the video sequence and output from the limiter.

15. A system as claimed in claim 11 wherein the temporal filter includes:
- a first field delay memory which receives noise filtered pixels of the current video sequence from the outputs of the spatial and temporal filters;
- a line delay memory which is coupled to the output of said first field delay memory;
- a second field delay memory the input of which is coupled to the output of said first field delay memory and having an output coupled to said median filter to produce said co-sited pixel from a delayed frame; and
- an averaging circuit which is coupled to outputs of the first field delay memory and the line delay memory to produce an average output signal which is said average of the two nearest pixels from the delayed field, said average output signal being coupled to an input of said median filter.

* * * * *